:::

United States Patent [19]

Slesar et al.

[11] 4,255,193

[45] Mar. 10, 1981

[54] METHOD OF MANUFACTURE OF SINTERED PRESSED PIECES OF IRON REINFORCED BY IRON OXIDES

[75] Inventors: Milan Slesar; Vladimir Miskovic; Eva Dudrová, all of Kosice, Czechoslovakia

[73] Assignee: Slovenska akademia vied, Bratislava, Czechoslovakia

[21] Appl. No.: 76,771

[22] Filed: Sep. 18, 1979

[30] Foreign Application Priority Data

Sep. 22, 1978 [CS] Czechoslovakia ............... 6109-78

[51] Int. Cl.³ ............................................. B22F 3/16
[52] U.S. Cl. ...................................... 75/206; 75/232; 75/246

[58] Field of Search .................... 75/206, 232, 246

[56] References Cited

U.S. PATENT DOCUMENTS 3,194,658  7/1965  Storchheim .................. 75/206

OTHER PUBLICATIONS

Lenel, F. V., "Steam Treatment of Porous Iron," Powder Metallurgy, Wulff, J. Ed., Chap. 46, pp. 512–519, 1942.

Primary Examiner—Richard E. Schafer

[57] ABSTRACT

A mixture of iron powder reinforced with iron oxides, are compressed and sintered to form improved sintered iron pressed pieces.

3 Claims, No Drawings

METHOD OF MANUFACTURE OF SINTERED PRESSED PIECES OF IRON REINFORCED BY IRON OXIDES

BACKGROUND OF THE INVENTION

The present invention relates to a method for the manufacture of sintered pressed pieces of iron reinforced by iron oxides.

A number of methods have heretofore been used to improve sintered pressed pieces containing iron. For example, such methods include, increasing the carbon content of the composition or adding alloys, such as alloys of copper, nickel, chromium, molybdenum, manganese and similar metals, or even the addition of microalloys of vanadium, titanium and similar metals. These additions may be made alone or in combination with a transformation strengthening, i.e., a strengthening caused by phase changes produced by heat treatment of the composition. In addition, dispersion agent and precipitation hardening of the composition were used. Suitable dispersion agents include oxides of aluminium, chromium, silicon, zirconium, cerium, yttrium, and thorium, and complex oxides of calcium-iron, magnesium-iron and others. Precipitation hardening is a reinforcement caused by precipitation of fine particles inside the grains. The resistance to movement by dislocation is thereby increased. Such technique, appears externally as an increase of the yield limit, which may be used as the measure of precipitation hardening. For improvement of quality of sintered materials, the importance of modern compacting methods, such as isostatic pressing, extrusion pressing, forging, rolling and the like have been employed.

For unalloyed sintered iron pressings, a typical strength range, depending on porosity, is 150 to 250 MPa for uncompacted and about 300 MPa for compacted pressings obtained, for instance, by forging. With use of alloys and heat treatment together with compacting at elevated temperatures, it is now possible to obtain materials having a strength of about 1000 MPa.

The microstructure of sintered unalloyed pressings without addition of iron oxides is formed by ferrite corns of a size of 15 to 30 μm, with a porosity depending on the process of the pressings. In the case of pressing powdered iron with a pressure of 600 MPa, followed by its sintering at a temperature of 1100° C. in a reduction atmosphere, a porosity of about 10 to 12 percent is achieved with pressings of a strength of only 180 to 200 MPa. Even with high pressure compacting at elevated temperatures, for instance by forging, this porosity can be reduced below 2 percent and a material with a corn size of 15 to 22 μm and with a strength of only up to 300 MPa can be obtained.

It is an object of the present invention to provide an improved process for manufacturing improved sintered pieces from pressings.

It is a further object of the present invention to enable the manufacture, without use of alloys, of sintered uncompacted iron pressings with a strength up to 300 MPa and compacted pressings with a strength up to 700 MPa.

SUMMARY OF THE INVENTION

According to the present invention to a process for forming sintered compressed iron members, in which a homogeneous mixture of iron powder having a particle size of between 0.01 to 0.315 mm and from 1 to 15 percent by volume or iron oxides, based on the total volume of the mixture, with a particle size of between 0.002 to 0.1 mm is formed.* From the obtained homogenized mixture, pressings with a porosity of up to 20 percent are made; these pressings are then sintered in a protective reduction atmosphere, within a temperature range of 900° C. to 1300° for 0.5 to 4 hours. The pressings thus prepared and formed have the ductility and toughness required for commercial use and can be advantageously and economically utilized for medium and higher stressed machine parts of lower unit weight.

*The limiting boundaries of the iron and iron oxide particle size are given by the dimensions of powder particles achieved by current production methods.

The iron powder can be any current commercial form used in the formation of iron sinterings. For example, powder formed from a spray melt in water is most suitable. Equally powder obtained by grinding, by reduction of oxides and by electrolytic processes may also be employed.

The iron oxides may be ground and cleaned iron oxides which can be obtained by heat rolling of wide bands of sheets or of shaped members can be used. In addition, iron oxides obtained by regeneration in pickling baths after pickling steel by hydrochloric or sulphuric acid are suitable. In all cases, a mixture of FeO and $Fe_2O_3$ is to be used.

The reduction atmosphere can be hydrogen, or decomposed ammonia, with a dew point of −20° C. Endogenous gases having a dew point of −10° to −40° C. or exogenous gases having a dew point of 0°−40° C. are also suitable.

The invention is based on a reinforcement of powder iron by dispersion of iron oxides therein, obtained under suitable sintering and cooling conditions. Such reinforcement results in:

(a) Medium size of particles of up to 10 nm and a means interparticle surface distance of 120 nm. The term "interparticle surface distance" means the statistically determined interparticle distance surface to surface. In case the particles are globes, this value does not characterize the distance of centers of globes, but the free distance between their surfaces.

(b) Static and dynamic recrystallization contributed by the fine precipitation of the oxides. The precipitates act as effective barriers to the migration of ferrite grains, indicating that extremely fine ferrite grains up to a size of 2.5 to 4 μm are created. Such extremely fine precipitates influence the creation and growth of recrystallization nuclei and, in consequence thereof, influence the kinetics of the whole recrystallization process and the final grain size.

(c) Reduction of the final porosity below 2% aided by the thermo-mechanic effect of compacting the mixture of iron powder and iron oxides.

As a result of the foregoing, an addition of only about 5 percent by volume of iron oxides to conventional iron powder can produce a sintered pressing having a strength of about 500 MPa. Reinforced forgings under prior art conditions, without addition of oxides have only strength of 300 MPa.

The following specific Examples illustrate the present invention:

EXAMPLE 1

A homogeneous mixture of iron powder and iron oxides was formed. The iron powder particles were obtained by spraying a melt of steel with low carbon content into water and annealed at a temperature of 800° C. for 2 hours in decomposed ammonia and had the following granulometric composition:

| mm | 0.25 to 0.2 | 0.2 to 016 | 0.16 to 0.1 | 0.1 to 0.06 | 0.06 to 0.04 | −0.04 |
|---|---|---|---|---|---|---|
| % by wt. | 7.5 | 16.0 | 32.0 | 31.0 | 5.5 | 8.0 |

The iron oxides were formed by a mixture of FeO and $Fe_2O_3$ produced in the course of hot rolling of wide bands, with grain sizes below 0.1 mm and the material was ground and magnetically separated by conventional means. It had the following granulometric composition:

| mm | 0.1 to 0.06 | 0.06 to 0.04 | −0.04 |
|---|---|---|---|
| % by wt. | 69.0 | 7.0 | 24.0 |

The iron oxides were added to the iron powder in an amount of 5 percent by volume. As lubricant, ZnS was used in an amount of 0.5 percent by weight, and the mixture homogenized in conventional mixing apparatus. Thereafter pressings were produced at a pressure of 600 MPa. The porosity after pressing was 15 percent. Sintering was then performed at a temperature of 1100° C. for 2 hours in an atmosphere of decomposed ammonia with a dew point of −20° C. Cooling was thereafter effected at medium speed of cooling from the sintering temperature within the temperature range from 1100° C. to 600° C. at 40° C. per minute. Tempering was not performed.

The pressings had, after sintering, an overall porosity of 14 percent. By the described working, the following mechanical properties were obtained: tensile strength: 250 MPa; ductility: 4 percent, hardness (according to Brinell): 67 HB.

For comparison mixtures without the addition of oxides were made, pressed and sintered by the same technology; they had the following properties: tensile strength: 170 MPa; ductility: 8 percent; hardness; 45 HB. Thus, the inclusion of iron oxides produces a substantial strengthening effect.

The samples constituted tools and machine parts such as those listed hereinafter.

EXAMPLE 2

Tool and machine part samples prepared by the process described in Example 1 were subsequently repressed at a pressure of 600 MPa and annealed at a temperature of 800° C. for 1 hour in a nitrogen atmosphere. The porosity of the finished samples after this working was 7.3 percent and had the following mechanical properties: tensile strength: 320 MPa; ductility: 4 percent; hardness: 85 HB. Comparison samples without the addition of oxides, pressings worked by the same technological process had the following mechanical properties: tensile strength: 225 MPa; ductility: 15 percent; hardness: 55 HB. This example shows equally the strengthening effect of iron oxides.

EXAMPLE 3

Samples prepared by the process described in Example 1 were subsequently heated at 1150° C. for 20 minutes in nitrogen and forged in a closed die. The medium speed of cooling after forging, from 1100° C. to 600° C. was 500° per minute. No tempering was performed. The overall porosity after forging was about 1 percent. The following mechanical properties were obtained by this working: tensile strength: 500 MPa; ductility: 10 percent; hardness: 155 HB; notch toughness at +20° C.: 65 $Jcm^{-2}$ (sharp notch). In this case, the most apparent strengthening effect of iron oxides has been obtained. Excellent machine parts were made of these samples.

EXAMPLE 4

Several samples were formed according to the process as described in Example 1 except that these samples were selectively dynamically compacted at a temperature between 1000° C. and 1200° C. by high pressure compacting, forging, rolling, extruding or by izostatic pressing in a reduction, inert or slightly oxidating atmosphere, after which cooled in air or by accelerated cooling, some being also annealed. Tools formed from these samples similar exhibited increased strength over comparison samples without iron oxides.

EXAMPLE 5

This example gives as an explanation the limiting addition of iron oxide. The upper limit 15% is explained by the application of steps according examples 3 and 4 i.e. compacted materials with a high strength up to 700 MPa with an increased hardness and wear resistance but with a lowered ductility. An important criterium of the upper limit is the green strength of pressings and the life of pressing tools materials. At a good cohesions of powder particle and a good quality of tools it is even possible to shift the limit by over 15% under the proviso of the prolongation of the sintering time, or the increase of sinter temperature in reduction atmosphere. We give the reason for the lower limit of iron oxide addition i.e. 1% in view of the increase of strength of 20–30 MPa.

In the foregoing examples the samples comprised sintered lower and medium alloyed machine elements, particularly forgings, e.g., constructional elements of smaller size for medium dynamic stress conditions with increased accuracy of dimensions and high quality of the surface without increased requirements for wear resistance, such as toothed gear wheels and pinions for lower specific pressures, connecting rods, levers and cranks with exception of their application in the aviation industry and for efficient automobile engines, hubs with flanges, clutch rings, crank arms and pull rods for application in the automobile industry, ratchets and pawls, connecting nuts and the like. Such elements require the mechanical properties mentioned in Example 3.

The method of this invention also is applicable to the production of sintered pressings, e.g., constructional elements made by powder iron metallurgy, where increased strength parameters are required in comparison with values obtained by the technology of preparation of unalloyed sintered iron pressings. Examples of such end products are guiding sleeves, extension and spacing rings, bodies of pumps and pistons, oscillating cranks and levers, toothed gear wheels and pinions and other smaller formed elements. These require the mechanical properties corresponding to those mentioned in Examples 1 and 2.

Advantages of reinforcement by iron oxides in accordance with this invention include:

(1) Current availability and low price of iron oxides; saving of relatively more expensive admixtures of alloys such as for instance Cu, Ni, but also C, Mn, Cr and others;

(2) Saving of technological expenses for preparation of powder alloy by spraying or mechanical mixing;

(3) Elimination of reinforcing admixtres of carbon and elimination of a protective atmosphere with controlled carbon potential;

(4) In most cases, elimination of additional heat treatment and expenses connected therewith in comparison with currently used techniques.

(5) The economic manufacture of forged machine parts adapted to medium and high range of stress as substitute for the lower or medium stress alloyed heat treated sintered elements;

(6) The ability to mass produce small tool elements;

(7) Increased reliability and work performance of the tools;

(8) The production of elements having long life but of higher porosity, as for example, self lubricating bearing, bonding elements.

The following technological method of pressing or compacting prior to or during sintering may be used - rolling, extrusion, as well as isostatic pressing may be used. This invention also enables direct forging of unsintered pressings in one cycle without previous sintering and cooling from the sintering temperature - "powder forging". In that case, the heating time in a reduction atmosphere has to be prolonged to at least 1 hour. At these conditions of working, it is possible to achieve, by inclusions of iron oxides, a reinforcing effect of the same level as indicated in Example 3 corresponding to the technology of "sinter forging".

Various modifications and changes have been suggested herein. The present disclosure is therefore to be taken as illustrative only and not limiting of the invention.

What is claimed is:

1. A method of manufacturing sintered pieces comprising the steps of homogenously mixing iron powder having a particle size of from 0.01 to 0.315 mm with iron oxide in an amount of from 1 to 15 percent by volume, based on the total volume of the mixture, said iron oxide having a particle size of from 0.002 to 0.1 mm, and sintering the resulting pressings in a reduction atmosphere within a temperature range between 900° C. and 1300° C. for 0.5 to 4 hours.

2. The method according to claim 1 wherein said pressing before sintering has a porosity of from 7 to 20 percent and after sintering of 1 to 14 percent.

3. The method according to claim 1 or 2, comprising the additional step of further compacting at elevated temperatures, thereby enabling further reduction of the porosity and the raising of the tensile strength.

* * * * *